(12) United States Patent
Koo et al.

(10) Patent No.: US 10,490,839 B2
(45) Date of Patent: Nov. 26, 2019

(54) RECHARGEABLE BATTERY

(71) Applicant: SAMSUNG SDI CO., LTD., Yongin-si, Gyeonggi-do (KR)

(72) Inventors: Min-Seok Koo, Yongin-si (KR); Sang-Won Byun, Yongin-si (KR); Hyun-Soo Lee, Yongin-si (KR); Hyun-Young Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 81 days.

(21) Appl. No.: 15/621,976

(22) Filed: Jun. 13, 2017

(65) Prior Publication Data
US 2018/0083302 A1    Mar. 22, 2018

(30) Foreign Application Priority Data

Sep. 21, 2016 (KR) .................. 10-2016-0120759

(51) Int. Cl.
*H01M 10/04* (2006.01)
*H01M 2/02* (2006.01)
(Continued)

(52) U.S. Cl.
CPC ......... *H01M 10/04* (2013.01); *H01M 2/0202* (2013.01); *H01M 2/06* (2013.01);
(Continued)

(58) Field of Classification Search
CPC .......... H01M 10/04; H01M 2/30; H01M 2/06; H01M 2/26; H01M 4/36; H01M 10/052; H01M 2/0202
See application file for complete search history.

(56) References Cited

U.S. PATENT DOCUMENTS 6,399,237 B1 * 6/2002 Souliac ............... H01M 2/0426
429/170
2011/0076553 A1 * 3/2011 Kameda ............... H01M 2/043
429/181
(Continued)

FOREIGN PATENT DOCUMENTS

KR      1986-0007973 A     11/1986
KR       10-0921704 B1     10/2009
(Continued)

*Primary Examiner* — Maria Laios
*Assistant Examiner* — Kwang Han
(74) *Attorney, Agent, or Firm* — Lewis Roca Rothgerber Christie LLP (57) ABSTRACT

A rechargeable battery includes: an electrode assembly including a first electrode, a second electrode, and a separator between the first electrode and the second electrode; a case configured to accommodate the electrode assembly and having an opening; a cap plate configured to be combined to the opening; a first current collecting member and a second current collecting member configured to be electrically connected to the first electrode and the second electrode, respectively; and a first terminal and a second terminal configured to be electrically connected to the first electrode and the second electrode, respectively, and the first current collecting member may include a first current collecting plate electrically connected to the first electrode, and a first connecting protrusion which protrudes from the first current collecting plate and has a first terminal hole into which the first terminal is inserted.

13 Claims, 8 Drawing Sheets

(51) Int. Cl.
  *H01M 2/06*   (2006.01)
  *H01M 2/26*   (2006.01)
  *H01M 4/36*   (2006.01)
  *H01M 10/052* (2010.01)
  *H01M 2/30*   (2006.01)

(52) U.S. Cl.
  CPC ............ *H01M 2/26* (2013.01); *H01M 2/30* (2013.01); *H01M 4/36* (2013.01); *H01M 10/052* (2013.01)

(56) References Cited

U.S. PATENT DOCUMENTS

2012/0058390 A1* 3/2012 Obayashi ............... H01M 2/30
                                                    429/179
2015/0179992 A1* 6/2015 Harayama ............... H01M 2/06
                                                    429/179

FOREIGN PATENT DOCUMENTS

| KR | 10-1264461 B1 | 5/2013 |
| WO | WO 2012/169055 A1 | 12/2012 |

\* cited by examiner

RECHARGEABLE BATTERY

CROSS-REFERENCE TO RELATED APPLICATION

This application claims priority to and the benefit of Korean Patent Application No. 10-2016-0120759, filed on Sep. 21, 2016 in the Korean Intellectual Property Office, the entire content of which is incorporated herein by reference.

BACKGROUND

1. Field

Aspects of embodiments of the present invention relate to a rechargeable battery.

2. Description of the Related Art

With the development of information and communication technologies, compact and lightweight portable electronic devices, such as mobile phones, laptop computers, and camcorders, are being actively developed and manufactured. These portable electronic devices use rechargeable batteries that can be repeatedly charged and discharged as a power source such that they may operate even in places where separate power sources are not provided.

The rechargeable battery generally includes a nickel-cadmium (Ni—Cd) battery, a nickel-hydrogen (Ni-MH) battery, a lithium secondary battery, etc., and the lithium secondary battery is manufactured to have various shapes that generally include a cylindrical shape, a prismatic shape, and a pouch shape.

The lithium secondary battery includes an electrode assembly including a positive electrode plate, a negative electrode plate, and a separator, a case accommodating the electrode assembly, an electrolyte solution injected into the case to be able to move lithium ions, and a cap assembly fixed to an upper portion of the case to seal the case.

The positive electrode plate and the negative electrode plate are respectively connected to corresponding electrode terminals, and the electrode terminals are positioned on the cap plate and penetrate the cap plate to be electrically connected to the positive electrode plate or the negative electrode plate. The electrode terminals may include different metals.

As such, when the electrode terminals include different metals, layers formed of different metals are bonded by friction welding, but the friction welding requires expensive equipment, thereby increasing manufacturing cost of the rechargeable battery.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery including an electrode terminal has reduced manufacturing cost and a simplified manufacturing process.

According to one or more exemplary embodiments of the present invention, a rechargeable battery includes: an electrode assembly including a first electrode, a second electrode, and a separator between the first electrode and the second electrode; a case configured to accommodate the electrode assembly and having an opening; a cap plate configured to be combined to the opening; a first current collecting member and a second current collecting member configured to be electrically connected to the first electrode and the second electrode, respectively; and a first terminal and a second terminal configured to be electrically connected to the first electrode and the second electrode, respectively, and the first current collecting member may include a first current collecting plate electrically connected to the first electrode, and a first connecting protrusion which protrudes from the first current collecting plate and has a first terminal hole into which the first terminal is inserted.

The first terminal may include a first plate-shaped member positioned on the cap plate, and a first connecting terminal connected to a lower portion of the first plate-shaped member and passing through the cap plate to be inserted into the first terminal hole.

The first plate-shaped member may include a lower layer made of copper and an upper layer positioned on the lower layer and made of aluminum, wherein the lower layer and the upper layer may be combined through a cold pressure welding process and a diffusion annealing process.

A diameter of the first connecting terminal may decrease as the first connecting terminal is farther away from the first plate-shaped member.

The first connecting terminal may include a first portion having a first diameter and a second portion having a second diameter less than the first diameter, and the second portion may be inserted into the first terminal hole.

The cap plate may include a second terminal hole through which the first connecting terminal passes, and the first connecting terminal may be inserted into a gasket and pass through the second terminal hole.

The gasket may include an extending portion that is bent along at least one of a top surface or a bottom surface of the cap plate to contact and overlap the at least one of the top surface or the bottom surface of the cap plate.

The first connecting protrusion may be positioned between the gasket and the first connecting terminal.

The first electrode may be a negative electrode.

The second current collecting member may include a second current collecting plate electrically connected to the second electrode, and a second connecting protrusion which protrudes from the second current collecting plate and has a third terminal hole into which the second terminal is inserted.

The second terminal may include a second plate-shaped member positioned on the cap plate, and a second connecting terminal connected to a lower portion of the second plate-shaped member and passing through the cap plate to be inserted into the third terminal hole.

The second plate-shaped member and the second connecting terminal may be made of aluminum.

According to an aspect of embodiments of the present invention, the electrode terminal may be manufactured at a lower cost by using a cold pressure welding process and a diffusion annealing process compared to a friction welding process, thereby reducing the manufacturing cost of the rechargeable battery.

According to another aspect of embodiments of the present invention, the electrode terminal may be easily installed at the cap plate and the current collecting member.

DESCRIPTION OF REFERENCE NUMERALS INDICATING SOME ELEMENTS IN THE DRAWINGS

2: notch
3: protrusion
4, 8, 71, 72: terminal hole
21a, 22a: electrode coated region
21b, 22b: electrode uncoated region
27: case
31: cap plate
34: vent hole
39: vent plate
51, 61: plate-shaped member
54, 63, 64: connecting terminal
58: auxiliary terminal
70: fuse hole
73: connecting protrusion
81, 82: gasket
84, 85: insulating member
101: rechargeable battery
120: electrode assembly
121: first electrode
122: second electrode
123: separator
130: insulating member
140, 142: current collecting member
300: cap assembly
500: first terminal
600, 602: second terminal

DETAILED DESCRIPTION

The present invention will be described more fully hereinafter with reference to the accompanying drawings, in which some exemplary embodiments of the invention are shown. As those skilled in the art would realize, the described embodiments may be modified in various different ways, all without departing from the spirit or scope of the present disclosure.

To clearly describe the present disclosure, portions which do not relate to the description may be omitted, and like reference numerals designate like elements throughout the specification.

Further, the size and thickness of components shown in the drawings may be arbitrarily shown for better understanding and ease of description, but the present disclosure is not limited thereto.

In the drawings, the thickness of layers, films, panels, regions, etc., may be exaggerated for clarity. For better understanding and ease of description, the thickness of some layers and areas may be exaggerated. Also, it will be understood that when an element such as a layer, film, region, or substrate is referred to as being "on" another element, it can be directly on the other element or one or more intervening elements may also be present.

In addition, unless explicitly described to the contrary, the word "comprise" and variations such as "comprises" or "comprising" will be understood to imply the inclusion of stated elements but not the exclusion of any other elements. An upper part of a target portion indicates an upper part or a lower part of the target portion, and it does not mean that the target portion is always positioned at the upper side based on a gravitational direction.

A rechargeable battery according to some exemplary embodiments of the present invention will be described in further detail with reference to the accompanying drawings.

Figure 1:
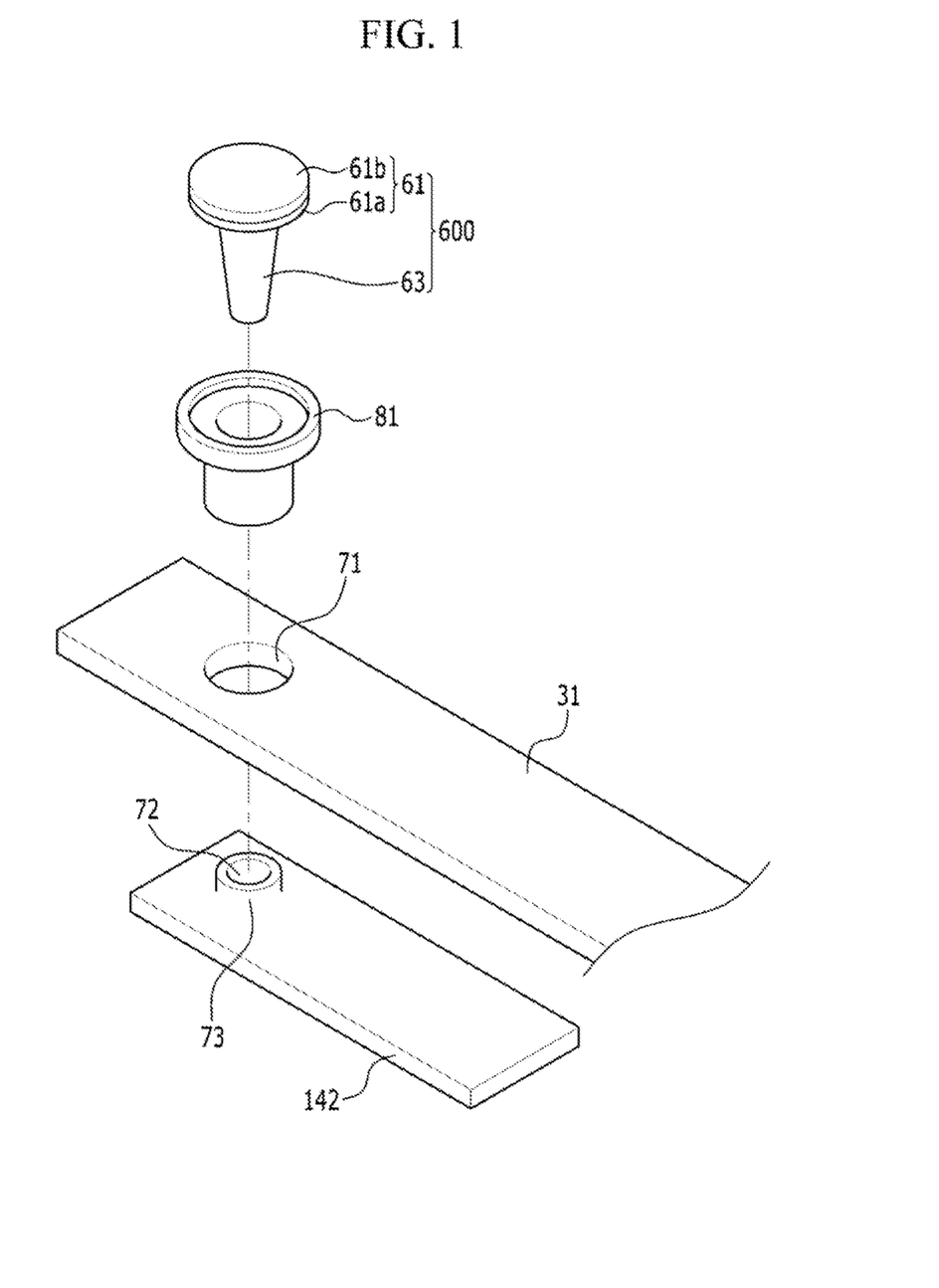
FIG. 1 illustrates a perspective view of a terminal portion of a rechargeable battery according to an exemplary embodiment of the present invention.
Figure 2:
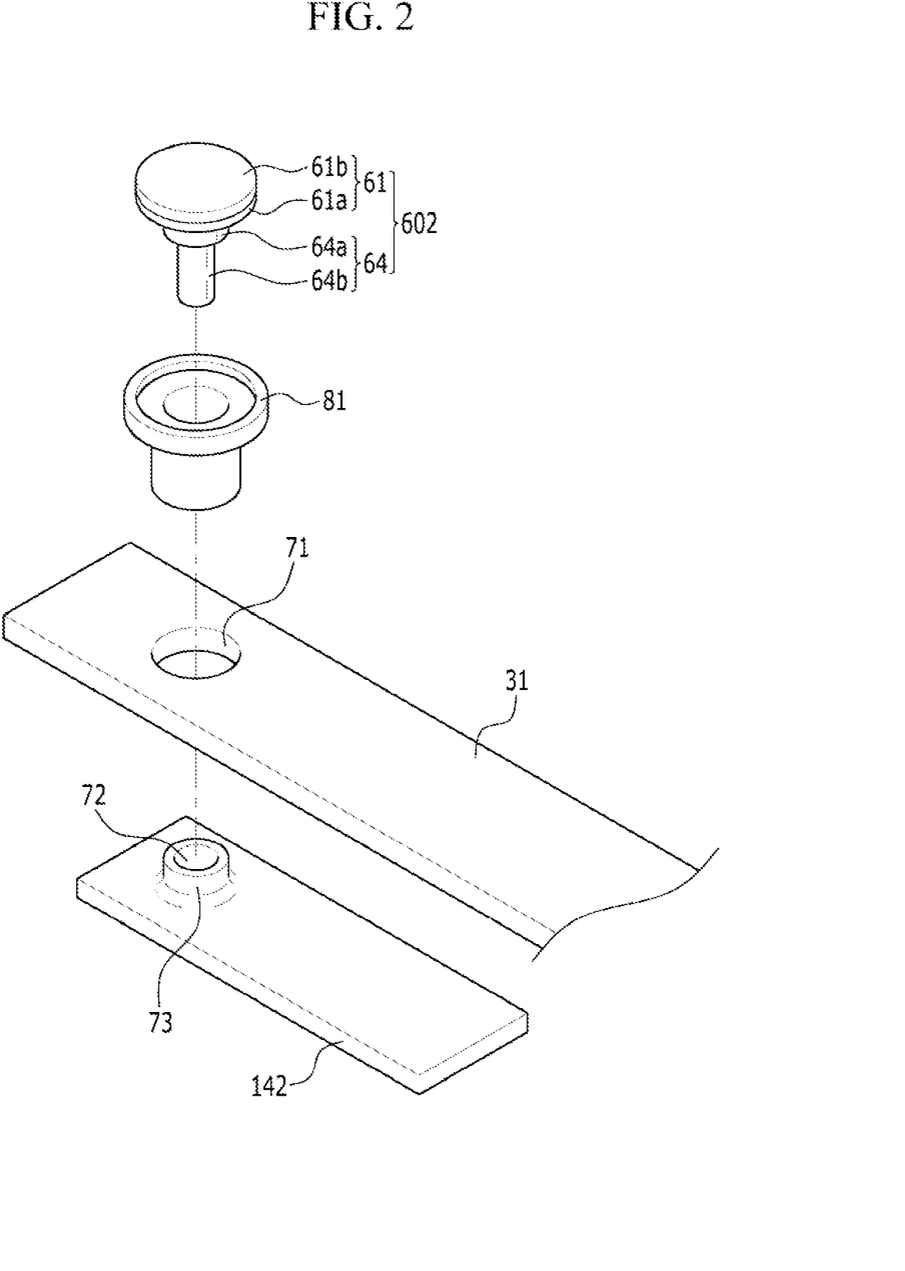
FIG. 2 illustrates a perspective view of a terminal portion of a rechargeable battery according to another exemplary embodiment of the present invention.

FIG. 1 illustrates a perspective view of a terminal portion of a rechargeable battery according to an exemplary embodiment of the present invention; and FIG. 2 illustrates a perspective view of a terminal portion of a rechargeable battery according to another exemplary embodiment of the present invention.

A terminal according to an exemplary embodiment of the present invention may be inserted into a through hole of a member at which the terminal is installed. The terminal may be a positive terminal installed at a cap plate of the rechargeable battery or another terminal (e.g., a predetermined terminal), and the terminal of FIG. 1 may be a negative terminal.

As shown in FIG. 1, a terminal 600 includes a plate-shaped member 61 and a connecting terminal 63 connected to the plate-shaped member 61. The terminal 600 may be inserted into a terminal hole 71 in a state of being inserted into a gasket 81.

The plate-shaped member 61 includes a lower layer 61a, and an upper layer 61b positioned on the lower layer 61a, and the lower layer 61a and the upper layer 61b are made of different metals. The lower layer 61a may be made of the same material as the connecting terminal 63, for example, copper, and the upper layer 61b may be made of aluminum, for example. In an embodiment, a diameter of the connecting terminal 63 may decrease as a distance of the connecting terminal 63 is farther away from the plate-shaped member 61. Accordingly, the connecting terminal 63 may be formed to be inclined with respect to a bottom surface of the plate-shaped member 61, such as inclined by a slope of about 3° to 6° with respect to the bottom surface.

As shown in FIG. 2, a connecting terminal 64 of a terminal 602 may include first and second portions 64a and 64b that have different diameters, and a difference between diameters of the first portion 64a and the terminal hole 71 may be a thickness of a gasket 81 that is inserted between the connecting terminal 64 and a lateral wall of the terminal hole 71.

The terminal may be formed by performing a cold pressing process, a molding process, and a diffusion annealing process for an aluminum wire and a copper wire. In an embodiment, the cold pressing process and the molding process that bond an aluminum wire and a copper wire for forming the terminal through a heading machine are performed, such that a preliminary terminal provided with a plate-shaped member including lower and upper layers and a connecting terminal is formed.

Next, the terminal is completed by diffusion-annealing of the preliminary terminal. In this case, an interface bonding force between the lower layer and the upper layer increases by the diffusion annealing process. As such, when the lower layer and the upper layer are bonded by performing the diffusion annealing process, since the expensive friction welding process is not required, it is possible to reduce the manufacturing cost of the terminal.

Referring back to FIG. 1, the gasket 81 seals between the cap plate 31 and the connecting terminal 63. In this case, since the connecting terminal 63 has a narrower diameter closer to its lower portion, it may be inserted into the gasket 81 like a wedge. In an embodiment, the gasket 81 may extend between the cap plate 31 and the plate-shaped member 61, and an end of the extended portion thereof may protrude in an upper direction to surround a lateral surface of the terminal 600. The protruding portion of the gasket serves to insulate the cap plate 31 and the terminal 600, but is not limited thereto, and when it is not required for the terminal to be insulated from the cap plate, the gasket may be formed only at the terminal hole 71.

The terminal 600 may be connected to a current collecting member 142 electrically connected to a negative electrode of a battery assembly. The current collecting member 142 may include a hollow tubular connecting protrusion 73. The connecting protrusion 73 is formed at the current collecting member 142, and it may be formed by protrusion of a peripheral portion surrounding a terminal hole 72 into which the connecting terminal 63 is inserted.

In an embodiment, the terminal 600 may be combined to the current collecting member 142 by spin riveting.

This will be described in further detail with reference to FIG. 3 and FIG. 4.

Figure 3:
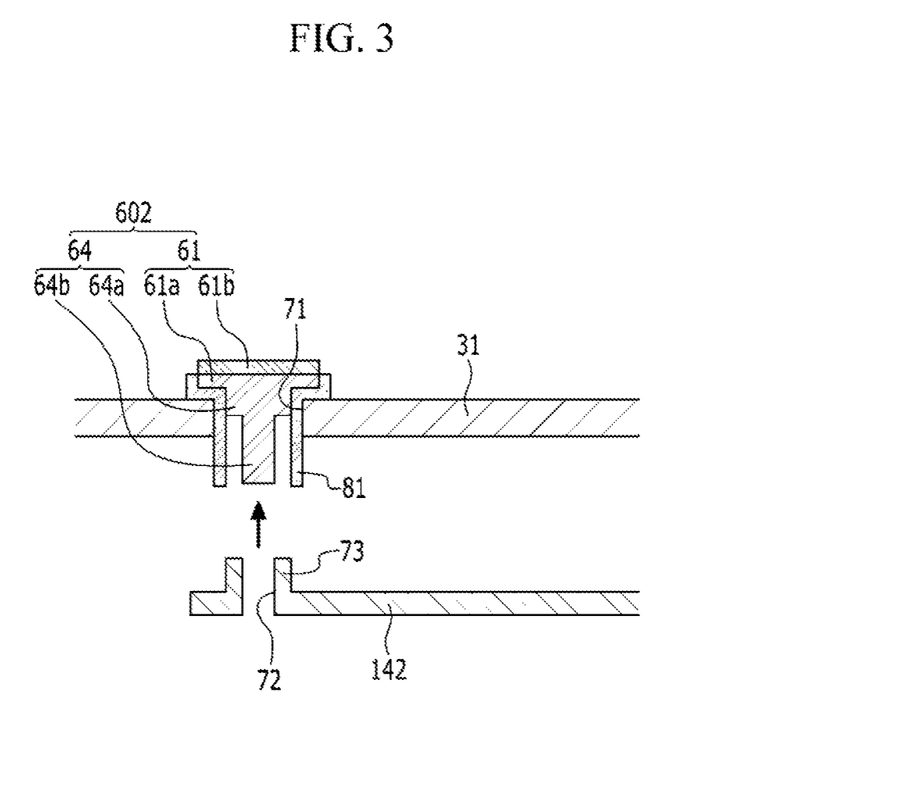
FIG. 3 and FIG. 4 illustrate cross-sectional views of a method of installing a terminal according to an exemplary embodiment of the present invention.
Figure 4:
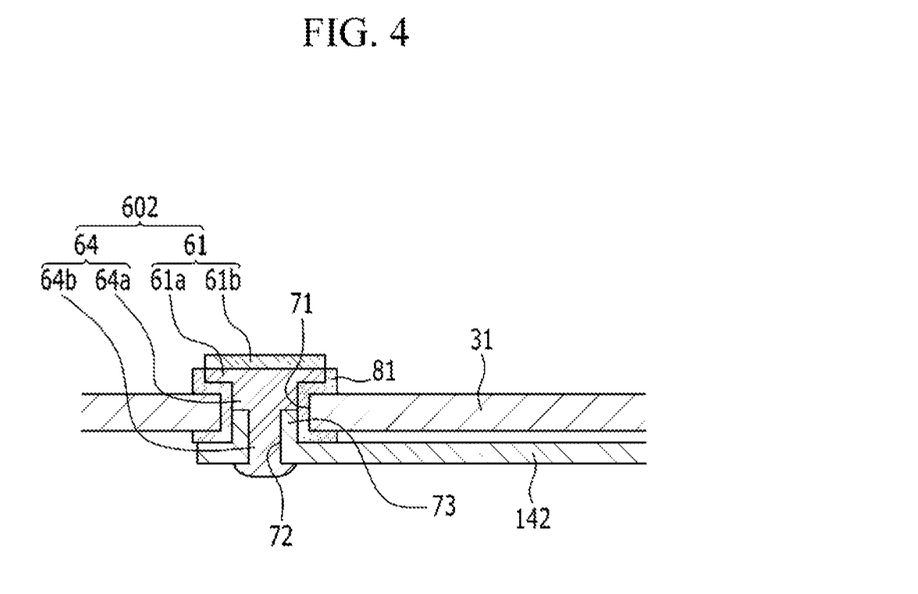

FIG. 3 and FIG. 4 illustrate cross-sectional views of a method of installing a terminal according to an exemplary embodiment of the present invention.

As shown in FIG. 3, the terminal 602 is inserted into the terminal hole 71 of the cap plate 31 together with the gasket 81. In this case, the terminal 602 shown in FIG. 2 is exemplarily described; however, the present invention is not limited thereto.

Then, the current collecting member 142 is disposed below the terminal 602. In this case, the connecting terminal 64 is disposed such that a center of the connecting terminal 64 and a center of the terminal hole 72 of the current collecting member 142 are corresponding or identical.

Next, as shown in FIG. 4, the connecting terminal 64 is inserted into the terminal hole 72 of the current collecting member 142. In this case, the connecting terminal 64 penetrates the current collecting member 142, and a portion of the connecting terminal 64 may protrude.

Subsequently, the connecting terminal 64 is combined with the current collecting member 142 by spin riveting. That is, while a shape of a lower end of the connecting terminal 64 is deformed by pressing a protruding lower portion of the connecting terminal 64 through a spin tool, the connecting terminal 64 may be closely fixed to a bottom surface of the current collecting member 142.

The gasket 81 may protrude outside of the terminal hole 71 together with the connecting terminal 64. Accordingly, in a spin riveting process, since the connecting protrusion 73 of the current collecting member 142 presses the gasket 81 while it is pushed and inserted into the gasket 81 and to surround the connecting terminal 64, the gasket 81 positioned outside of the current collecting member 142 may be bent toward a bottom surface of the cap plate 31.

An extending portion of the gasket 81 bent toward the bottom surface of the cap plate 31 may be used as an insulating member for insulating between the cap plate 31 and the current collecting member 142.

According to an exemplary embodiment of the present invention, by forming the connecting protrusion 73 to be inserted into the gasket 81, the electrode terminal may be combined to the current collecting member. In this case, the gasket 81 is bent toward a top surface or the bottom surface of the cap plate 31 to overlap the cap plate 31, thereby increasing a sealing force therebetween and improving the insulation therebetween.

A rechargeable battery including the aforementioned terminal will be described in further detail with reference to the accompanying drawings.

Figure 5:
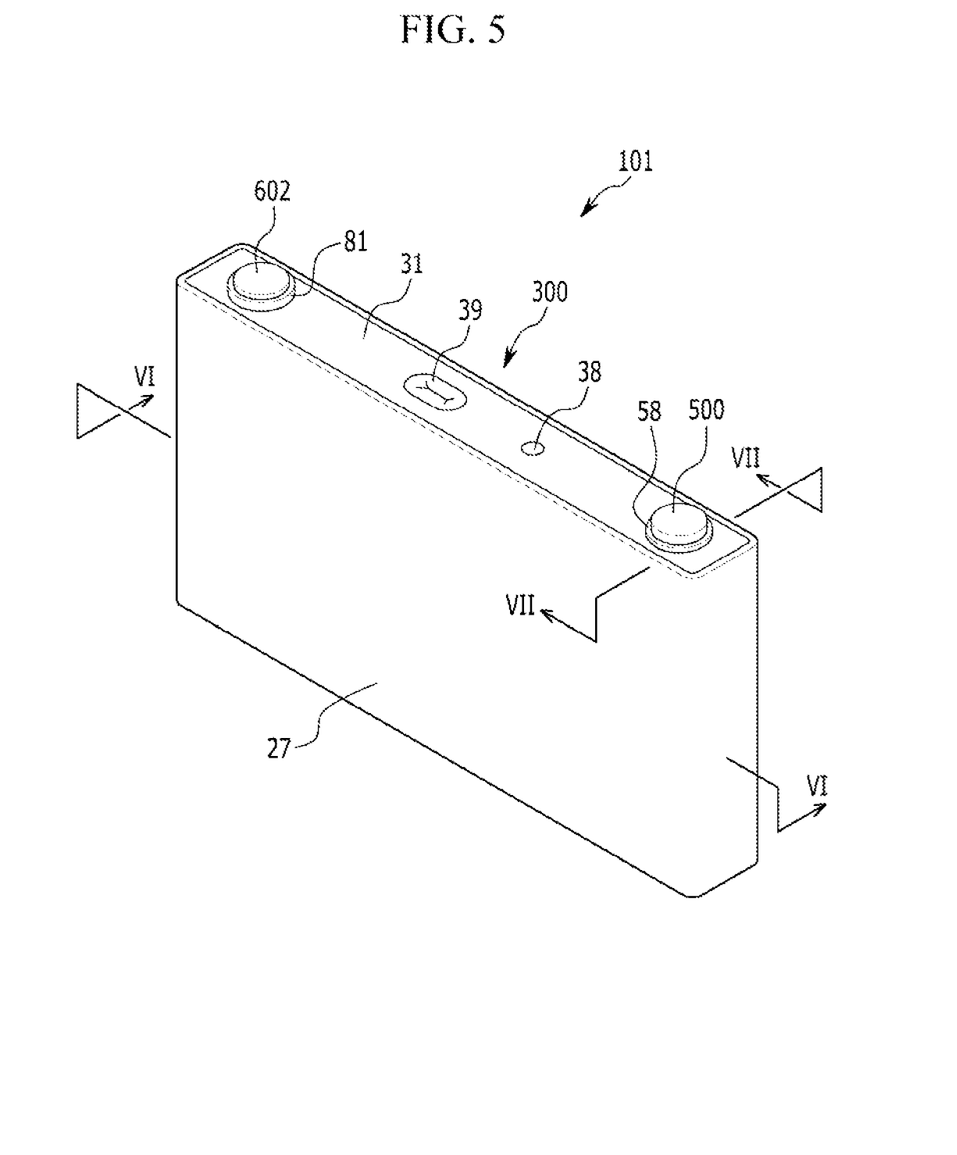
FIG. 5 illustrates a perspective view of a rechargeable battery according to an exemplary embodiment of the present invention.
Figure 6:
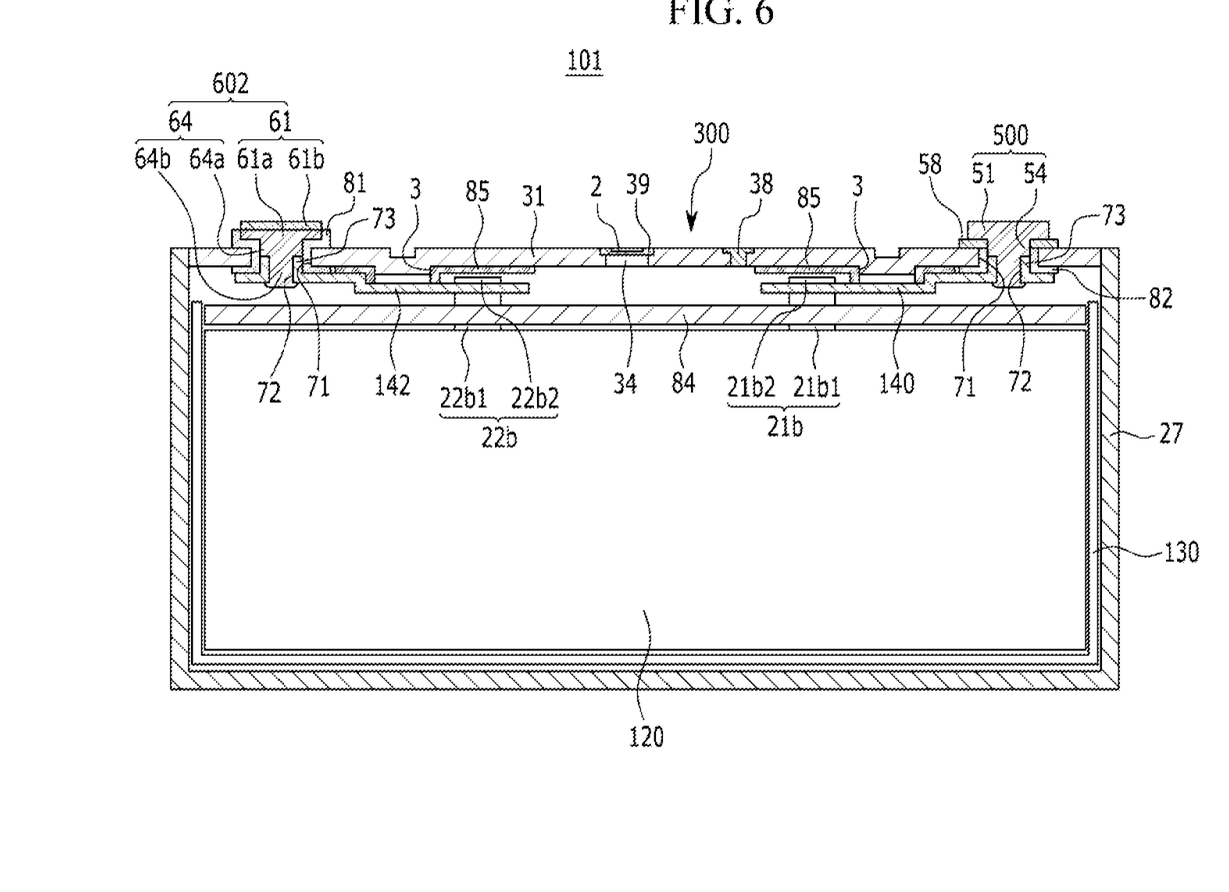
FIG. 6 illustrates a cross-sectional view of the rechargeable battery of FIG. 5, taken along the line VI-VI.

FIG. 5 illustrates a perspective view of a rechargeable battery according to an exemplary embodiment of the present invention; FIG. 6 illustrates a cross-sectional view of the rechargeable battery of FIG. 5, taken along the line VI-VI; and FIG. 7 illustrates a cross-sectional view of the rechargeable battery of FIG. 5, taken along the line VII-VII.

Figure 7:
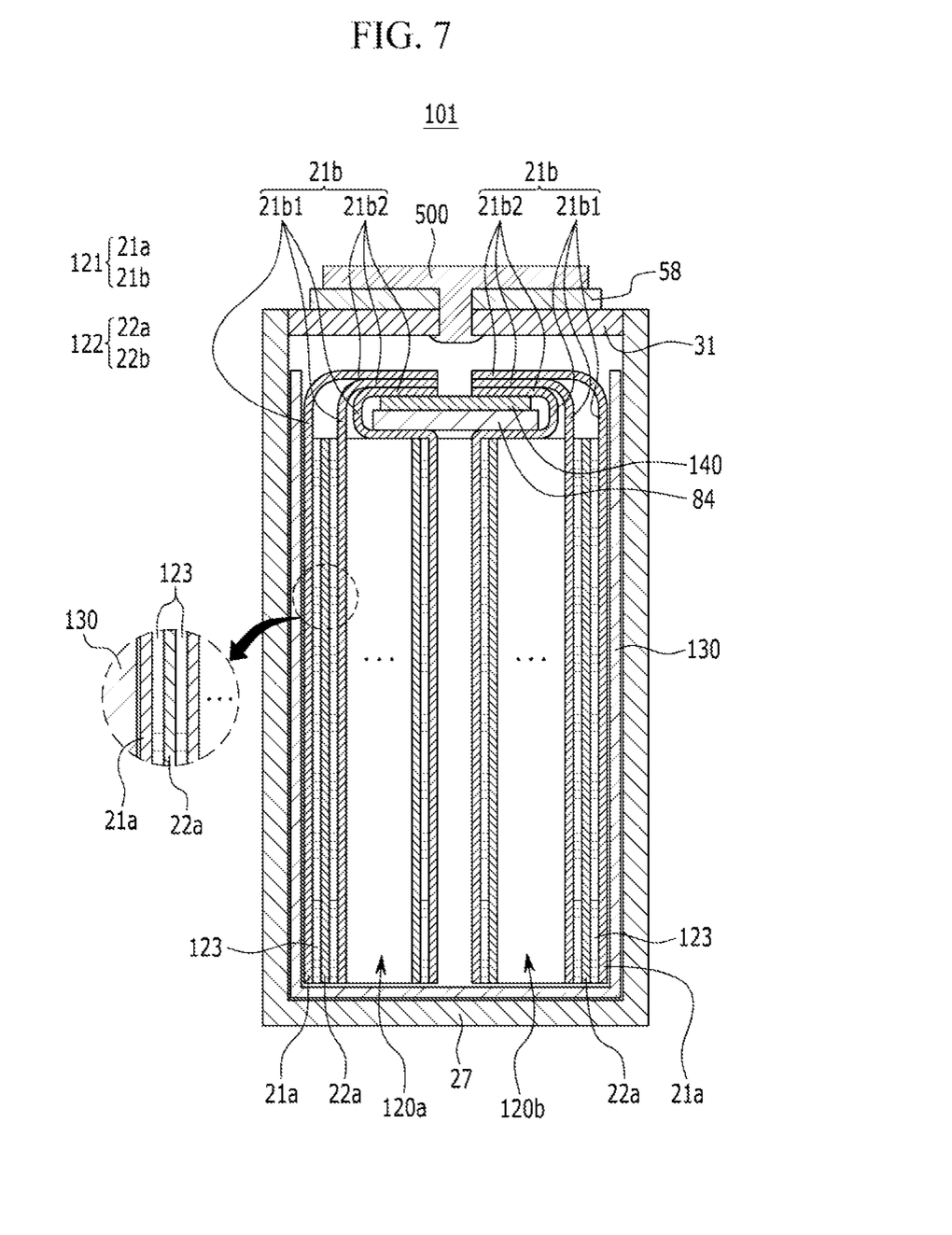
FIG. 7 illustrates a cross-sectional view of the rechargeable battery of FIG. 5, taken along the line VII-VII.

As shown in FIG. 5 to FIG. 7, a rechargeable battery 101 according to an exemplary embodiment of the present invention includes an electrode assembly 120 in which a first electrode 121 and a second electrode 122 are spirally wound with a separator 123 interposed therebetween, a current collecting member 140 electrically connected to the electrode assembly 120, a case 27 accommodating the current collecting member 140 and the electrode assembly 120, and a cap assembly 300 combined to an opening of the case 27.

The rechargeable battery 101 will be exemplarily described as being a lithium ion rechargeable battery having a prismatic shape. However, embodiments of the present invention are not limited thereto, and the present invention may be applicable to various types of batteries.

In an embodiment, the electrode assembly 120 may include a plurality of assemblies 120a and 120b, and each assembly 120a and 120b is spirally wound based on a winding axis while the separator 123 is interposed between the first electrode 121 and the second electrode 122, and then pressed to be flattened. The first and second electrodes 121 and 122 include respective first and second electrode coated regions 21a and 22a where an active material is coated on a thin plate formed of a metal foil, and respective first and second electrode uncoated regions 21b and 22b where the active material is not coated thereon.

The first electrode coated region 21a may be formed by coating a metal foil, such as one formed of aluminum with an active material such as a transition metal oxide or the like, and the second electrode coated region 22a may be formed by coating a metal foil, such as one formed of copper or nickel with an active material such as graphite, carbon, or the like.

The first electrode uncoated region 21b and the second electrode uncoated region 22b respectively protrude from ends of the first electrode coated region 21a and the second electrode coated region 22a toward the cap assembly 300. In an embodiment, the first electrode uncoated region 21b and the second electrode uncoated region 22b are formed by cutting the metal foil to protrude, and each of the first electrode uncoated region 21b and the second electrode uncoated region 22b may be integrally formed with the metal foil of each of the first electrode coated region 21a and the second electrode coated region 22a. Since the first electrode uncoated region 21b and the second electrode uncoated region 22b have different polarities, they are spirally wound to be spaced apart from each other to not be short circuited.

In an embodiment, the first electrode 121, the separator 123, and the second electrode 122 are repeatedly wound, such that they are overlapped with each other. Accordingly, the first electrode uncoated region 21b and the second electrode uncoated region 22b may respectively overlap a plurality of thin layers, and thus they may be connected for the thin layers to contact each other, such as by ultrasonic welding, to allow a current to easily flow.

The separator 123 is positioned between the first electrode coated region 21a and the second electrode coated region 22a to prevent a short circuit therebetween, and the separator 123 allows lithium ions to move. In an embodiment, the separator 123 may be formed of polyethylene, polypropylene, or a composite film of polyethylene and polypropylene.

The electrode assembly 120 may be inserted into the case 27 in a direction parallel to the winding axis and is substantially accommodated in case 27 together with an electrolyte solution. The electrolyte solution may be composed of an organic solvent, such as EC(ethylene carbonate), PC(propylene carbonate), DEC(diethyl carbonate), EMC(ethyl methyl carbonate), and/or DMC(dimethyl carbonate), and a Li salt such as $LiPF_6$ and/or $LiBF_4$. The electrolyte solution may be in a liquid, solid, or gel state.

The electrode assembly 120 may include the first electrode assembly 120a and the second electrode assembly 120b, which will be described with reference to FIG. 8.

Figure 8:
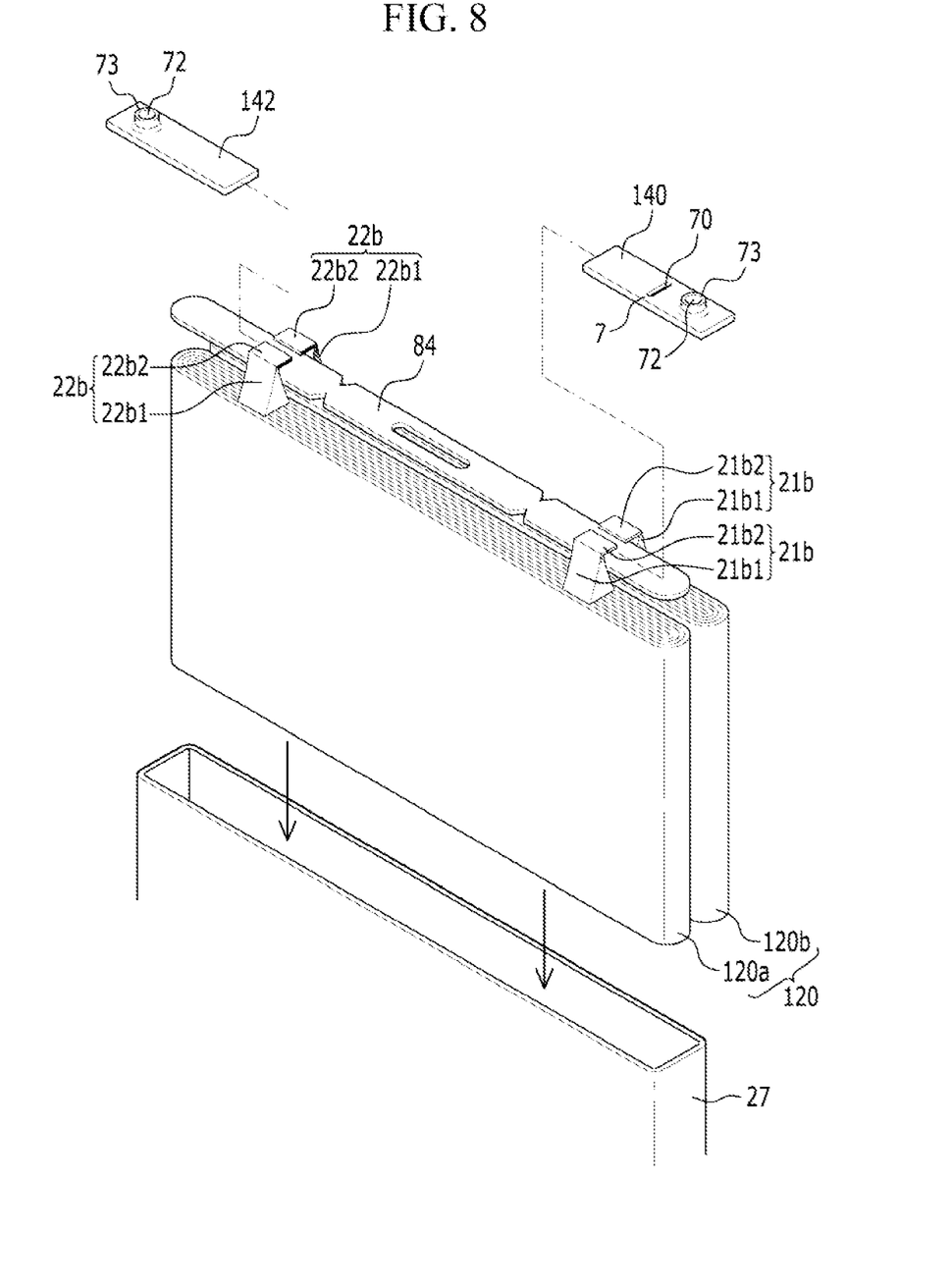
FIG. 8 illustrates an exploded perspective view of a portion of the rechargeable battery of FIG. 5, in which a case, an electrode assembly, and a current collecting member of the rechargeable battery are shown.

FIG. 8 illustrates an exploded perspective view of a portion of the rechargeable battery 101, in which the case 27, the electrode assembly 120, and the current collecting member 140 of the rechargeable battery 101 are shown.

As shown in FIG. 8, the first electrode assembly 120a and the second electrode assembly 120b in the electrode assembly 120 may be electrically connected to each other.

In the first electrode assembly 120a and the second electrode assembly 120b, the electrode uncoated regions of the same polarity are electrically connected by the current collecting members 140 and 142. That is, the first electrode uncoated regions 21b of the first electrode assembly 120a and the second electrode assembly 120b are electrically connected by the first current collecting member 140, and the second electrode uncoated regions 22b of the first electrode assembly 120a and the second electrode assembly 120b are electrically connected by the second current collecting member 142.

In an embodiment, the first electrode uncoated regions 21b of the first electrode assembly 120a and the second electrode assembly 120b are bent in a direction facing each other, and the second electrode uncoated regions 22b of the first electrode assembly 120a and the second electrode assembly 120b are bent in a direction facing each other. Accordingly, the first and second electrode uncoated regions 21b and 22b may respectively include first uncoated regions 21b1 and 22b1 (see FIGS. 6 and 8) that are connected to the metal foil of the electrode coated region to protrude in a direction of the cap assembly 300, and second uncoated regions 21b2 and 22b2 (see FIGS. 6 and 8) that extend from the respective first uncoated regions 21b1 and 22b1 and have surfaces contacting the respective first and second current collecting members 140 and 142.

In an embodiment, a surface of the first current collecting member 140 that is a surface relatively close to the cap plate 31 and a surface of the second uncoated region 21b2 that is a surface relatively close to the first current collecting member 140 contact to be electrically connected, and a surface of the second current collecting member 142 that is a surface relatively close to the cap plate 31 and a surface of the second uncoated region 22b2 that is a surface relatively close to the second current collecting member 142 contact to be electrically connected. However, the present invention is not limited thereto, and, in another embodiment, a surface of the first current collecting member 140 may contact another surface of the second uncoated region 21b2 to be electrically connected, and a surface of the second current collecting member 142 may contact another surface of the second uncoated region 22b2 to be electrically connected.

The first current collecting member 140 and the second current collecting member 142 may have substantially quadrangular plate shapes which are the same, for example. The first current collecting member 140 and the second current collecting member 142 having the substantially quadrangular plate shape may be formed of a low resistance metal, and, in an embodiment, the first current collecting member 140 may be formed of aluminum, and the second current collecting member 142 may be formed of copper.

Each of the first current collecting member 140 and the second current collecting member 142 is formed to have the terminal hole 72 and the connecting protrusion 73 formed by protrusion of the peripheral portion surrounding the terminal hole 72.

In an embodiment, the first current collecting member 140 includes a fuse hole 70 which may be a slit crossing the first current collecting member 140 in a width direction thereof, and a portion which remains at opposite sides of the fuse hole 70 to become a fuse 7.

In an embodiment, the fuse 7 formed by the fuse hole 70 of a slit shape formed at the first current collecting member 140 has a narrow width, and when a temperature thereof increases over a temperature (e.g., a predetermined temperature), it is melted and cut. Accordingly, when the rechargeable battery 101 is heated due to an abnormal operation or the like, the fuse 7 is cut such that the rechargeable battery 101 may not be further heated, and it is thereby possible to prevent or substantially prevent the rechargeable battery 101 from exploding due to being heated.

The first current collecting member 140 may further include a blocking member (not shown) for surrounding the first current collecting member 140 including the fuse 7. The blocking member is formed as an insulator, and serves to block an arc. The blocking member may be made of polyimide. In an embodiment, the blocking member may be formed or made of a heat-resistant resin such as polytetrafluoroethylene (PTFE) (e.g., TEFLON).

A first insulating member 84 (see FIGS. 6 and 8) may be disposed between the electrode assembly 120 and the current collecting members 140 and 142. The first insulating member 84 supports the first and second current collecting members 140 and 142, and insulates between the electrode assembly 120 and the first and second current collecting members 140 and 142. In an embodiment, the first insulating member 84 includes a through-hole formed at a position corresponding to a vent member (see FIG. 5) of the cap plate 31.

Referring back to FIG. 5 to FIG. 7, in an embodiment, the case 27 is formed to have a cuboidal shape, and one surface thereof is provided with an opening. The case 27 may be made of a metal material, such as aluminum, stainless steel, etc.

The cap assembly 300 includes the cap plate 31 for covering the opening of the case 27, a first terminal 500 that protrudes outside the cap plate 31 and is electrically connected to the first electrode 121, and the second terminal 602 that protrudes outside the cap plate 31 and is electrically connected to the second electrode 122.

The cap plate 31 is formed to have a plate shape extending in a direction, and is combined with the opening of the case 27. The cap plate 31 may be made of the same material as the case 27, and may be combined with the case 27, such as through a laser welding process. Accordingly, the cap plate 31 may have the same polarity as that of the case 27.

The cap plate 31 includes an electrolyte injection opening 38 for injecting an electrolyte solution, and a pair of terminal holes 71. In addition, a vent plate 39 provided with a notch 2 that can be opened under a pressure (e.g., a predetermined pressure) is installed in a vent hole 34 of the cap plate 31.

In an embodiment, the first terminal 500 and the second terminal 602 may be formed to have the same shape as the terminal shown in FIG. 2.

The first terminal 500 includes a plate-shaped member 51 and a connecting terminal 54. In an embodiment, the plate-shaped member 51 of the first terminal 500 and the connecting terminal 54 are made of the same material, and may be integrally formed. The first terminal 500 may be made of the same metal as a substrate of the first electrode 121, for example, of aluminum.

The plate-shaped member 51 of the first terminal 500 is positioned on the cap plate 31, and the connecting terminal 54 is inserted into the terminal hole 71 of the cap plate 31 and the terminal hole 72 of the first current collecting member 140 to be electrically connected to the first electrode 121 through the first current collecting member 140.

An auxiliary terminal 58 for electrically connecting the plate-shaped member 51 of the first terminal 500 and the cap plate 31 to each other may be further provided.

The plate-shaped member 61 of the second terminal 602 is positioned on the cap plate 31, and the connecting terminal 64 is inserted into the terminal hole 71 of the cap plate 31 and the terminal hole 72 of the second current collecting member 142 to be electrically connected to the second electrode 122 through the second current collecting member 142. The plate-shaped member 61 of the second terminal 602 includes the lower layer 61a and the upper layer 61b.

In an embodiment, diameters of the plate-shaped member 51 of the first terminal 500 and the plate-shaped member 61 of the second terminal 602 are greater than that of the terminal hole 71 of the cap plate 31, and the respective terminal holes 71 are covered by the plate-shaped members 51 and 61.

In an embodiment, the first terminal 500 is inserted not only into the terminal hole of the auxiliary terminal 58 but also into the terminal hole of the cap plate 31 and the terminal hole 72 of the first current collecting member 140 to be electrically connected to the first electrode 121 through the connecting terminal 54 bonded or coupled (e.g., by spin riveting) to the first current collecting member 140.

In a state in which the first terminal 500 and the second terminal 602 are inserted into the gaskets 82 and 81, they are inserted into the terminal hole 71 of the cap plate 31.

The first terminal 500 and the second terminal 602 are respectively inserted into the gaskets 82 and 81 and then inserted into the terminal holes 72 of the first and second current collecting members 140 and 142. In an embodiment, the first terminal 500 and the second terminal 602 may be combined with the first and second current collecting members 140 and 142, respectively, according to the manner shown in FIG. 3 and FIG. 4. In this case, lower portions of the gaskets 82 and 81 protruding downward through the cap plate 31 are bent toward the bottom surface of the cap plate 31 to insulate between the cap plate 31 and the first and second current collecting members 140 and 142.

Between the cap plate 31 and the first and second current collecting members 140 and 142, a second insulating member 85 that insulates between the cap plate 31 and the first and second current collecting members 140 and 142 and supports the cap plate 31 may be further provided.

The second insulating member 85 may be formed to extend along the first and second current collecting members 140 and 142. The second insulating member 85 may be formed to have a fastening hole of a concave shape, and a protrusion 3 formed at the bottom surface of the cap plate 31 may be inserted into the fastening hole such that the second insulating member 85 may be fixed to the cap plate 31.

The protrusion 3 may be formed by the cap plate 31 being bent toward the bottom surface thereof, but embodiments of the present invention are not limited thereto, and a protrusion may be formed over the bottom surface. In one embodiment, a plurality of protrusions and a plurality of fastening holes may be provided.

In an embodiment, the electrode assembly 120 may be surrounded by an insulating member 130, and the insulating member 130 surrounding the electrode assembly 120 may be an insulating member of a box or band shape for accommodating the electrode assembly 120 therein.

While the present invention has been described in connection with what are presently considered to be some practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly including a first electrode, a second electrode, and a separator between the first electrode and the second electrode;
a case configured to accommodate the electrode assembly and having an opening;
a cap plate configured to be combined to the opening;
a first current collecting member and a second current collecting member configured to be electrically connected to the first electrode and the second electrode, respectively; and
a first terminal and a second terminal configured to be electrically connected to the first electrode and the second electrode, respectively,
wherein the first current collecting member includes a first current collecting plate electrically connected to the first electrode, and a first connecting protrusion which protrudes from the first current collecting plate and has a first terminal hole into which the first terminal is inserted, wherein the first terminal hole passes through the first current collecting plate and the first connecting protrusion so as to pass entirely through the first current collecting member.

2. The rechargeable battery of claim 1, wherein the first terminal includes a first plate-shaped member positioned on the cap plate, and a first connecting terminal connected to a lower portion of the first plate-shaped member and passing through the cap plate to be inserted into the first terminal hole.

3. The rechargeable battery of claim 2,
wherein the first plate-shaped member includes a lower layer made of copper, and an upper layer positioned on the lower layer and made of aluminum, and wherein the lower layer and the upper layer are combined through a cold pressure welding process and a diffusion annealing process.

4. The rechargeable battery of claim 2, wherein a diameter of the first connecting terminal decreases as the first connecting terminal is farther away from the first plate-shaped member.

5. The rechargeable battery of claim 2,
wherein the first connecting terminal includes a first portion having a first diameter and a second portion having a second diameter less than the first diameter, and
wherein the second portion is inserted into the first terminal hole.

6. The rechargeable battery of claim 2,
wherein the cap plate includes a second terminal hole through which the first connecting terminal passes, and
wherein the first connecting terminal is inserted into a gasket and passes through the second terminal hole.

7. The rechargeable battery of claim 6, wherein the gasket includes an extending portion that is bent along at least one of a top surface or a bottom surface of the cap plate to contact and overlap the at least one of the top surface or the bottom surface of the cap plate.

8. The rechargeable battery of claim 6, wherein the first connecting protrusion is positioned between the gasket and the first connecting terminal.

9. The rechargeable battery of claim 1, wherein the first electrode is a negative electrode.

10. The rechargeable battery of claim 1, wherein the second current collecting member includes a second current collecting plate electrically connected to the second electrode, and a second connecting protrusion which protrudes from the second current collecting plate and has a third terminal hole into which the second terminal is inserted.

11. The rechargeable battery of claim 10, wherein the second terminal includes a second plate-shaped member positioned on the cap plate, and a second connecting terminal connected to a lower portion of the second plate-shaped member and passing through the cap plate to be inserted into the third terminal hole.

12. The rechargeable battery of claim 11, wherein the second plate-shaped member and the second connecting terminal are made of aluminum.

13. The rechargeable battery of claim 1, wherein the first terminal penetrates the first terminal hole and protrudes at an inner side of the first current collecting plate.

\* \* \* \* \*